United States Patent
Lee et al.

(10) Patent No.: US 7,924,923 B2
(45) Date of Patent: Apr. 12, 2011

(54) MOTION ESTIMATION AND COMPENSATION METHOD AND DEVICE ADAPTIVE TO CHANGE IN ILLUMINATION

(75) Inventors: Yung-Lyul Lee, Seoul (KR); Euee-S Jang, Seoul (KR); Chung-Ku Lee, Inchon (KR)

(73) Assignee: Humax Co., Ltd., Gyeonggi-do (KR)

( * ) Notice: Subject to any disclaimer, the term of this patent is extended or adjusted under 35 U.S.C. 154(b) by 1471 days.

(21) Appl. No.: 11/289,650

(22) Filed: Nov. 30, 2005

(65) Prior Publication Data
US 2006/0133501 A1    Jun. 22, 2006

(30) Foreign Application Priority Data

Nov. 30, 2004 (KR) .................. 10-2004-0099398
Jan. 14, 2005 (KR) .................. 10-2005-0003949

(51) Int. Cl.
*H04N 7/12* (2006.01)
*H04N 11/04* (2006.01)

(52) U.S. Cl. ......... 375/240.16; 375/240.24; 375/240.12; 375/240.03; 375/240.2

(58) Field of Classification Search ............. 375/240.26, 375/240.24, 240.16, 240.01, 240.03, 240.22, 375/240.12, 240.2
See application file for complete search history.

(56) References Cited

U.S. PATENT DOCUMENTS 5,699,474 A * 12/1997 Suzuki et al. .................. 386/68

* cited by examiner

*Primary Examiner* — Dov Popovici
(74) *Attorney, Agent, or Firm* — Baker Botts L.L.P.

(57) ABSTRACT

Provided are a motion estimation device and method adaptive to change in illumination. The motion estimation method includes the steps of: generating a current frame pattern block and a reference frame pattern block for a reference frame block; calculating the sum of absolute differences (SAD) for candidate pattern blocks and determining the candidate pattern block corresponding to the SAD satisfying a predetermined condition among the calculated SAD as a motion vector; encoding the current frame block, and adding flag information indicating the addition of a mean pixel value applied to the encoded current frame block and identification information on the encoding mode as header information corresponding to the encoded current frame block.

21 Claims, 10 Drawing Sheets

(a)

(b)

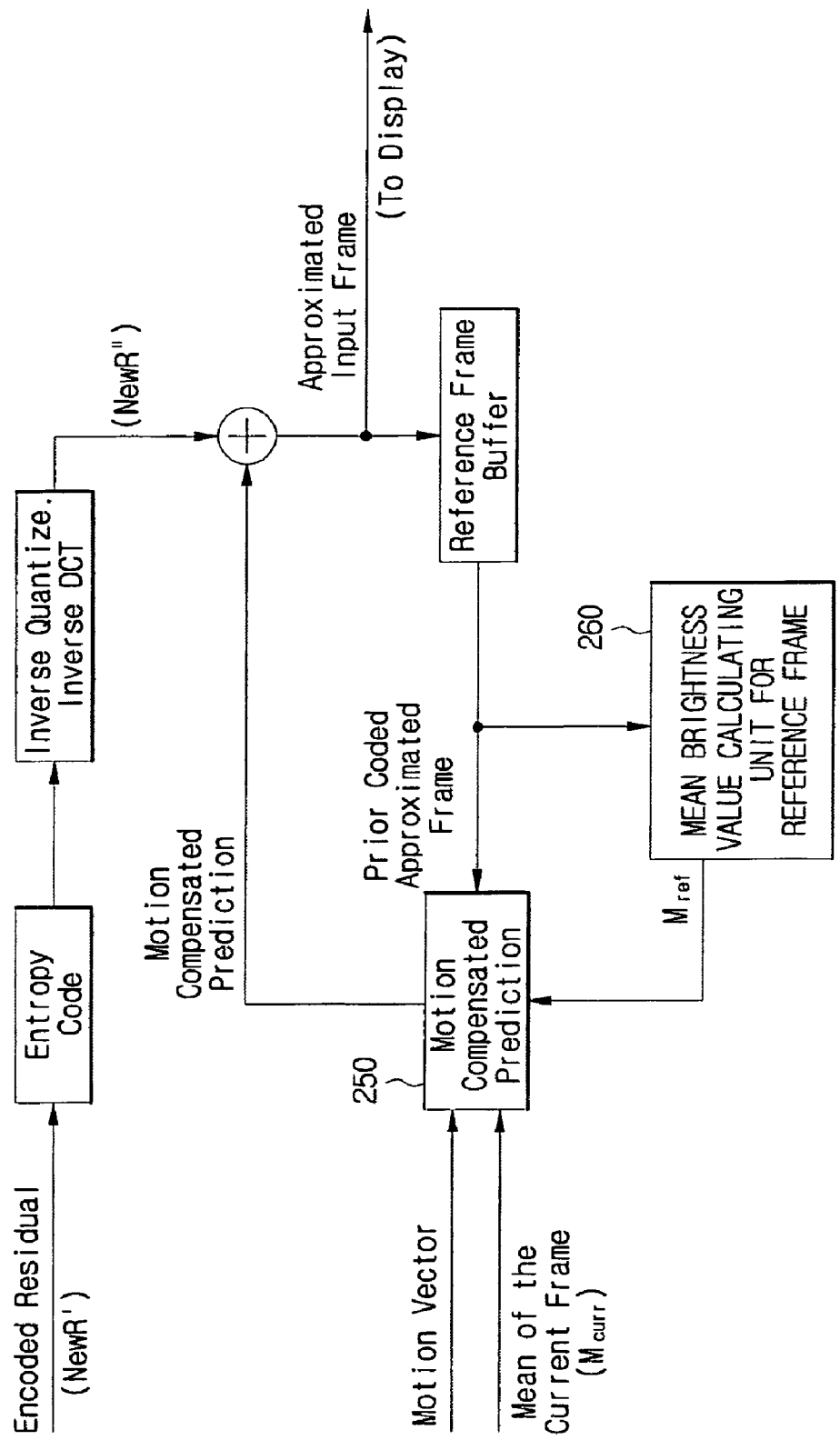

Objects1(QVGA, 10Hz)

MOTION ESTIMATION AND COMPENSATION METHOD AND DEVICE ADAPTIVE TO CHANGE IN ILLUMINATION

BACKGROUND OF THE INVENTION

1. Field of the Invention

The present invention relates to a motion estimation method and device adaptive to change in illumination, more particularly to a method and device that can efficiently encode and decode an image by use of a motion estimation (ME) process and a motion compensation (MC) process adaptive to change in illumination.

2. Description of Related Art

ITU-T and ISO/IEC developed the H.26x series and MPEG-x series while studying to improve efficiency in image encoding. H.264 (part 10 Advanced Video Coding, MPEG-4) was completed in 2003 and thus many bits could be saved. Studies for block matching motion estimation (BMME) were vigorously carried out with development of such video coding standards. In most methods, the sum of absolute differences (SAD) (hereinafter, referred to as "SAD") between blocks of the current frame and candidate blocks of the reference frame is calculated, and the position of the candidate block of the reference frame corresponding to the least SAD is determined as a motion vector of the blocks of the current frame.

Then, discrete cosine transform (DCT) and quantization are performed to difference signals (residual) between the candidate block and the current frame block, and variable length coding (VLC) is performed like the motion vector. Here, since the search for the motion vector means that the motion vector is acquired by removing temporal redundancy between the current frame and the reference frame, the encoding efficiency is remarkably improved, but there are the following problems:

When illumination changes (e.g., scene change in an image, fade-up or fade-down, or flickering) between interviews input through different cameras at the same time axis or between same-views input through the same camera at continuous time axes at the time of multi-view video coding, calculating SADs between blocks, using the conventional art, to obtain the least SAD and encode a difference signal takes an excessive quantity of bits, drastically slowing the compression ratio.

Generally, when there is a scene change, intra encoding is more effective than the motion estimation and the motion compensation for the changed frame. This is because the pattern of the current frame block cannot be found in any search area of the reference frame. Similarly, when there is flickering or a change in lighting, similar results are obtained by use of the same method of encoding the difference signal through the motion estimation. Hence, it is often intra encoded. However, in this case, since there was no scene change, a block having a pattern similar to the current frame block can be found from the reference frame, but it takes a large volume of bits for encoding the difference between the block and the current frame block.

TECHNICAL OBJECTIVES

The present invention is contrived to solve the above-mentioned problems by providing a motion estimation/compensation method and device adaptive to change in illumination that can efficiently encode and decode an image by use of motion estimation and motion compensation adaptive to change in illumination.

Another objective of the present invention is to provide a motion estimation/compensation method and device adaptive to change in illumination that can minimize the amount of bit streams transmitted to a decoder by omitting insertion of a mean pixel value for an aribitrary field.

Another objective of the present invention is to provide a motion estimation/compensation method and device adaptive to change in illumination that can efficiently compress an image without performing intra coding for change in illumination.

Another objective of the present invention is to provide a codec that is strong against change in illumination in actual surroundings.

Other objectives of the present invention will become apparent from a preferred embodiment described below.

DESCRIPTION

According to an aspect of the present invention, there is provided a motion estimation method adaptive to change in illumination.

The motion estimation method according to a preferred embodiment of the invention comprises the steps of: (a) generating a current frame pattern block for a current frame block and a reference frame pattern block for a reference frame block; (b) calculating the sum of absolute differences (SAD) for candidate pattern blocks corresponding to the current frame pattern block among the reference frame pattern blocks and determining the candidate pattern block corresponding to the SAD satisfying a predetermined condition among the calculated SADs as a motion vector; (c) encoding the current frame block, by generating a residual signal using a difference signal between the candidate pattern block corresponding to the motion vector and the current frame pattern block then performing discrete cosine transform and quantization to the residual signal with a predetermined encoding mode; and (d) adding flag information indicating the addition of a mean pixel value applied to the encoded current frame block and identification information on the encoding mode as header information corresponding to the encoded current frame block.

In the motion estimation method, step (a) can comprise the steps of: calculating a mean brightness value of the current frame block and a mean brightness value of the reference frame block; and generating the current frame pattern block by subtracting the mean brightness value of the current frame block from brightness values of the current frame block and generating the reference frame pattern blocks by subtracting the mean brightness value of the reference frame block from brightness values of the reference frame block.

The motion estimation method can further comprise the step of encoding the mean pixel value of the current frame block.

The SAD corresponding to the predetermined condition refers to the least SAD, and the SAD can be calculated by the following equation:

$$NewSAD(x, y) = \sum_{i=0}^{U-1} \sum_{j=0}^{V-1} |[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

The residual signal can be calculated by the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

The motion estimation method according to another embodiment of the invention may comprise the steps of: (a) generating a current frame pattern block for a current frame block and a reference frame pattern block of a reference frame block; (b) calculating the sum of absolute differences (SADs) for candidate pattern blocks corresponding to the current frame pattern block among the reference frame pattern blocks and determining the candidate pattern block corresponding to the SAD satisfying a predetermined condition among the calculated SADs as a motion vector; (c) encoding the current frame block, by generating a residual signal using a difference signal between the candidate pattern block corresponding to the motion vector and the current frame pattern block then performing discrete cosine transform and quantization to the residual signal with a predetermined encoding mode; and (d) adding flag information indicating whether a mean pixel value of the encoded current frame block is included and identification information on the encoding mode to the encoded current frame block as header information. Here, whether the mean pixel value of the current frame block is included can be identified by the flag information.

The current frame block may be set to at least one type of 16×16, 16×8, 8×16, 8×8, 8×4, 4×8, and 4×4.

When the flag information indicates that the mean pixel value is not included, a mean value of mean pixel values corresponding to n blocks surrounding the current frame block may be used as the mean pixel value of the current frame block.

When the flag information does not contain the mean pixel value and the header information further contains additional information indicating that the mean pixel value corresponding to any block among the blocks surrounding the current frame block should be used, a mean pixel value of the block corresponding to the additional information may be used as the mean pixel value of the current frame block.

In the motion estimation method, step (a) can comprise the steps of: calculating a mean brightness value of the current frame block and a mean brightness value of the reference frame block; and generating the current frame pattern block by subtracting the mean brightness value of the current frame block from brightness values of the current frame block and generating the reference frame pattern blocks by subtracting the mean brightness value of the reference frame block from brightness values of the reference frame block.

The motion estimation method may further comprise the step of encoding the mean pixel value of the current frame block.

The SAD satisfying the predetermined condition may indicate the least SAD and the SAD may be calculated by the following equation:

$$NewSAD(x, y) = \sum_{i=0}^{U-1}\sum_{j=0}^{V-1} |[f(i, j) - M_{curr}] - [r(i + x, j + y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current, frame, r(i+x,j+y) denotes a pixel value of a coordinate (i+x,j+y) of the reference frame, U and V denote the sizes of blocks used for matching the blocks, and (x,y) denotes the motion vector.

The residual signal may be calculated by the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

According to another aspect of the invention, there is provided a motion estimation device adaptive to change in illumination.

The motion estimation device according to a preferred embodiment of the invention can comprise: a pattern block generating unit generating a current frame pattern block of a current frame block and reference frame pattern blocks of a reference frame block; a motion vector determining unit calculating the sum of absolute differences (SAD) of candidate pattern blocks corresponding to the current frame pattern block among the reference frame pattern blocks and determining the candidate pattern block corresponding to the SAD satisfying a predetermined condition among the calculated SADs as a motion vector; a motion compensation unit generating a residual signal using a difference signal between the candidate pattern block corresponding to the motion vector and the current frame pattern block; and an adding unit adding flag information indicating the addition of a mean pixel value applied to the encoded current frame block and identification information on the encoding mode as header information corresponding to the encoded current frame block.

The pattern block generating unit may: calculate a mean brightness value of the current frame block and a mean brightness value of the reference frame block; generate the current frame pattern block by subtracting the mean brightness value of the current frame block from brightness values of the current frame block; and generate the reference frame pattern blocks by subtracting the mean brightness value of the reference frame block from brightness values of the reference frame block.

The motion estimation device may further comprise a unit carrying out discrete cosine transform and quantization for the residual signal.

The SAD corresponding to the predetermined condition refers to the least SAD and the motion vector determining unit can calculate the SAD with the following equation:

$$NewSAD(x, y) = \sum_{i=0}^{U-1}\sum_{j=0}^{V-1} |[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

The motion compensation unit can calculate the residual signal with the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

The motion estimation device according to another preferred embodiment of the invention can comprise: a pattern block generating unit generating a current frame pattern block for a current frame block and a reference frame pattern block for a reference frame block; a motion vector determining unit calculating the sum of absolute differences (SAD) of candidate pattern blocks corresponding to the current frame pattern block among the reference frame pattern blocks and determining the candidate pattern block corresponding to the SAD satisfying a predetermined condition among the calculated SADs as a motion vector; a motion compensation unit generating a residual signal using a difference signal between the candidate pattern block corresponding to the motion vector and the current frame pattern block; and an adding unit adding flag information indicating whether a mean pixel value of the encoded current frame block is included and identification information on the encoding mode to the encoded current frame block as header information. Here, whether the mean pixel value of the current frame block is included can be identified by the flag information.

When the flag information indicates that the mean pixel value is not included, a mean value of mean pixel values corresponding to n blocks surrounding the current frame block may be used as the mean pixel value of the current frame block.

When the flag information does not contain the mean pixel value and the header information further contains additional information indicating that the mean pixel value corresponding to any block among the blocks surrounding the current frame block should be used, a mean pixel value of the block corresponding to the additional information may be used as the mean pixel value of the current frame block.

The pattern block generating unit may: calculate a mean brightness value of the current frame block and a mean brightness value of the reference frame block; generate the current frame pattern block by subtracting the mean brightness value of the current frame block from brightness values of the current frame block, and generate the reference frame pattern blocks by subtracting the mean brightness value of the reference frame block from brightness values of the reference frame block.

The motion estimation device may further comprise a unit carrying out discrete cosine transform and quantization to the residual signal.

The SAD satisfying the predetermined condition may indicate the least SAD and the motion vector determining unit may calculate the SAD with the following equation:

$$NewSAD(x, y) = \sum_{i=0}^{U-1}\sum_{j=0}^{V-1} |[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i+x,j+y) denotes a pixel value of a coordinate (i+x,j+y) of the reference frame, U and V denote the sizes of blocks used for matching the blocks, and (x,y) denotes the motion vector.

The motion compensation unit may calculate the residual signal with the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

BRIEF DESCRIPTION OF THE DRAWINGS

The above and other features and advantages of the present invention will become more apparent in the detailed description of a preferred embodiment thereof with reference to the attached drawings in which:

FIG. 2C is a block diagram illustrating a configuration of a decoding device according to a preferred embodiment of the invention.

DETAILED DESCRIPTION OF THE INVENTION

Figure 1:
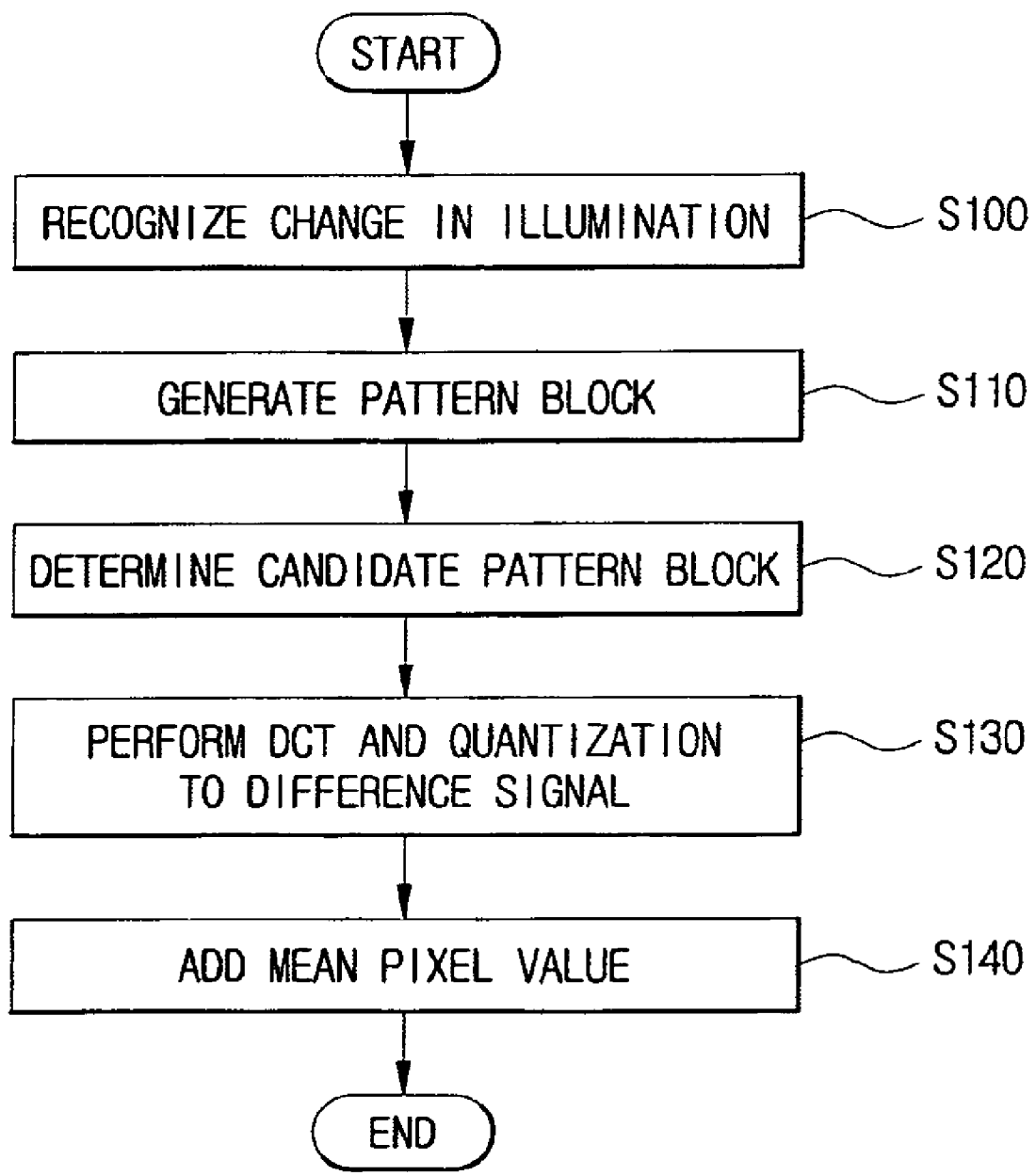
FIG. 1 is a flowchart illustrating an operation order of an adaptive motion estimation method according to a preferred embodiment of the invention.

Hereinafter, a motion estimation/compensation device and method adaptive to change in illumination according to a preferred embodiment of the present invention will be described in detail with reference to the attached drawings such that the present invention can be easily put into practice by those skilled in the art. In the drawings, like elements are denoted by like reference numerals and thus repeated description thereof is omitted.

FIG. 1 is a flowchart illustrating an operation order of an adaptive motion estimation method according to a preferred embodiment of the invention.

In the adaptive motion estimation method according to the invention, when illumination of an image changes or the image flickers, a block most similar in pattern is searched for and encoded without performing an intra coding process.

That is, by considering that the brightness value Y of a block increases or decreases as a whole with change in illumination, a mean brightness value of a current block is calculated and a new pattern block is generated by subtracting the calculated mean value from the brightness value Y. A reference pattern block for a reference frame is generated through the same process.

The present invention provides a method of performing a motion estimation process using the generated current pattern block and the reference pattern block and performing an encoding process (hereinafter; referred to as "pattern encoding method").

According to the invention, the objective image quality (PSNR: Peak Signal-to-Noise Ratio) is enhanced by 0.1 dB to 0.3 dB at the same bit rate and thus it is possible to provide a codec that is strong against change in illumination in actual circumstances.

Now, an operation order of the pattern encoding method according to the invention is described with reference to FIG. 1.

First, in S100, the change in illumination such as flickering is recognized, and then it is determined that the pattern encoding method using the motion estimation according to the invention should be performed without performing the conventional intra coding process.

In S110, candidate blocks having a pattern most similar to the current frame block are searched for from the reference frame blocks. For this purpose, a pattern block of the current frame block is generated by calculating a mean value of brightness values Y in the current frame block and subtracting the mean brightness value from the brightness values Y. Then, pattern blocks of the reference frame blocks are generated from the reference frame through the same process.

When the pattern blocks of the current frame block and the reference frame blocks are all generated, the SADs between the pattern blocks are calculated and a candidate pattern block exhibiting the least SAD is determined as the final motion vector, in S120.

Thereafter, the generated pattern blocks are used for enhancing an encoding efficiency. That is, in S130, a discrete cosine transform (DCT) process and a quantization process are performed to a difference signal (hereinafter, referred to as "residual signal") between the pattern block of the candidate block indicated by the final motion vector and the pattern block of the current frame block, thereby performing the encoding process without using many bits. Here, a mean pixel value may be encoded together.

In S140, the encoded mean pixel value of the current frame block is added to the encoded current frame block and then is transmitted to a decoder. Here, the mean pixel value can be encoded and transmitted by use of conventional coding processes or coding processes to be developed in the future. At this time, the block may be set to a type such as of 16×16, 16×8, 8×16, 8×8, 8×4, 4×8, or 4×4. By omitting the transmission of the mean pixel values of some blocks, it is possible to reduce the amount of bit streams to be transmitted.

In this way, since blocks which should be inevitably subjected to the intra coding can be encoded by use of the motion estimation, it is possible to enhance the encoding efficiency.

Figure 2A:
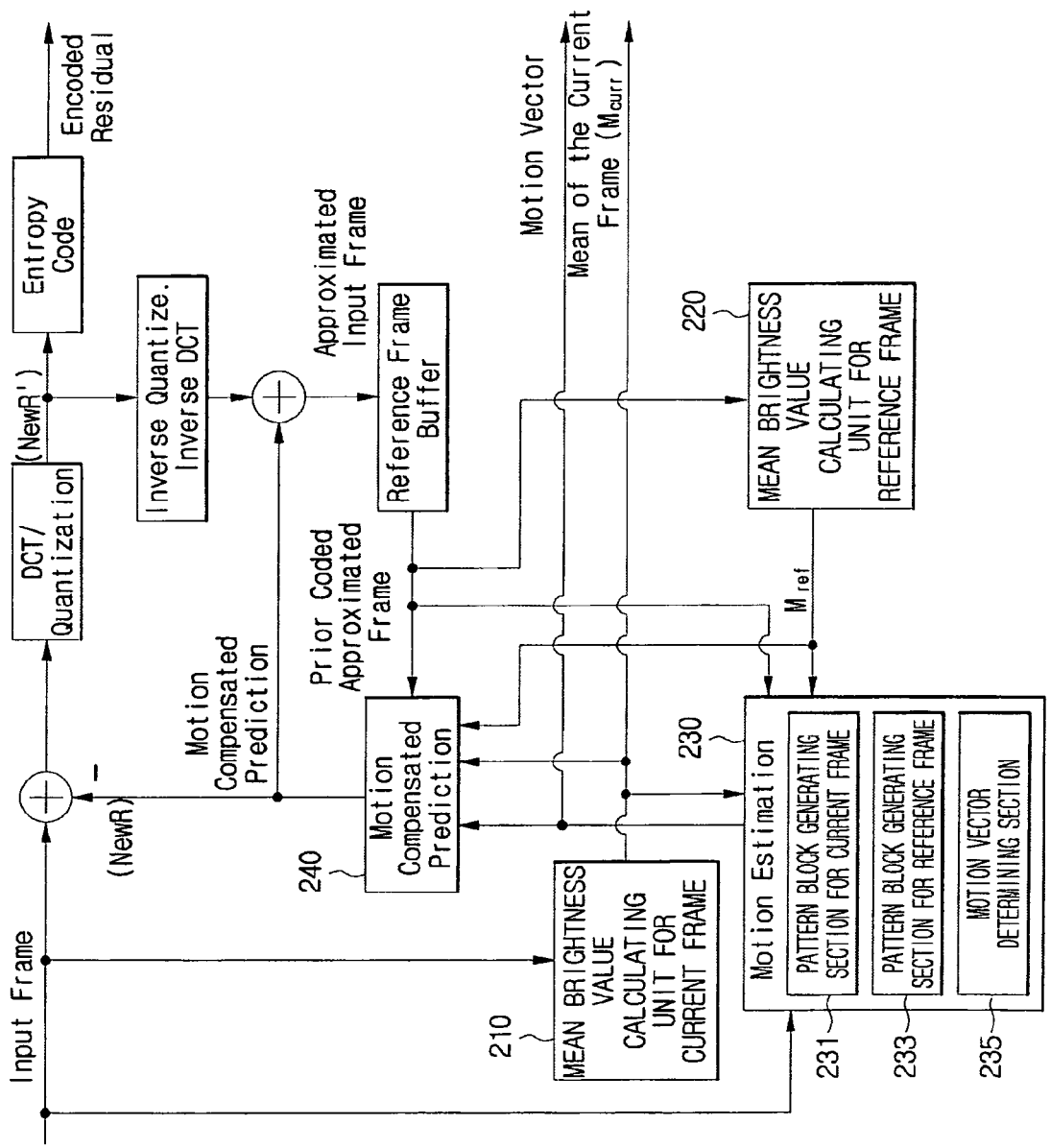
FIG. 2A is a block diagram illustrating a configuration of an encoding device according to a preferred embodiment of the invention.
Figure 2B:
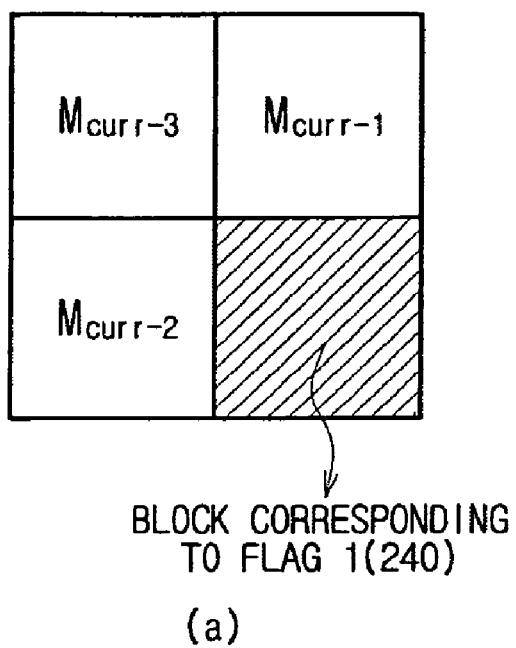
FIG. 2B is a diagram illustrating a method of omitting insertion of a mean pixel value for a block according to a preferred embodiment of the invention.
Figure 2B:
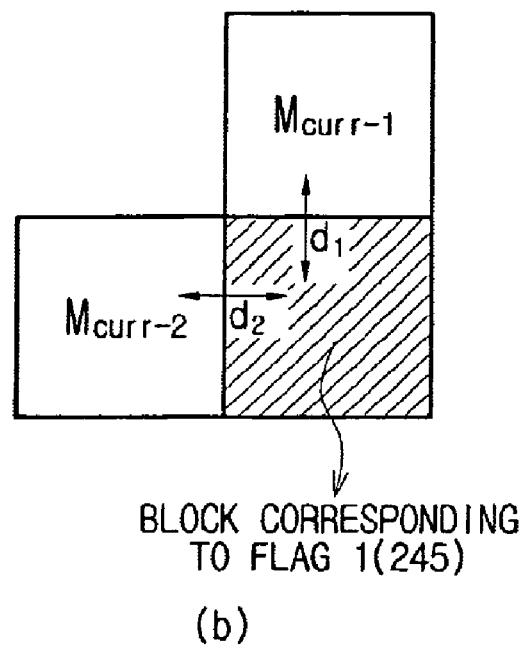
Figure 3A:
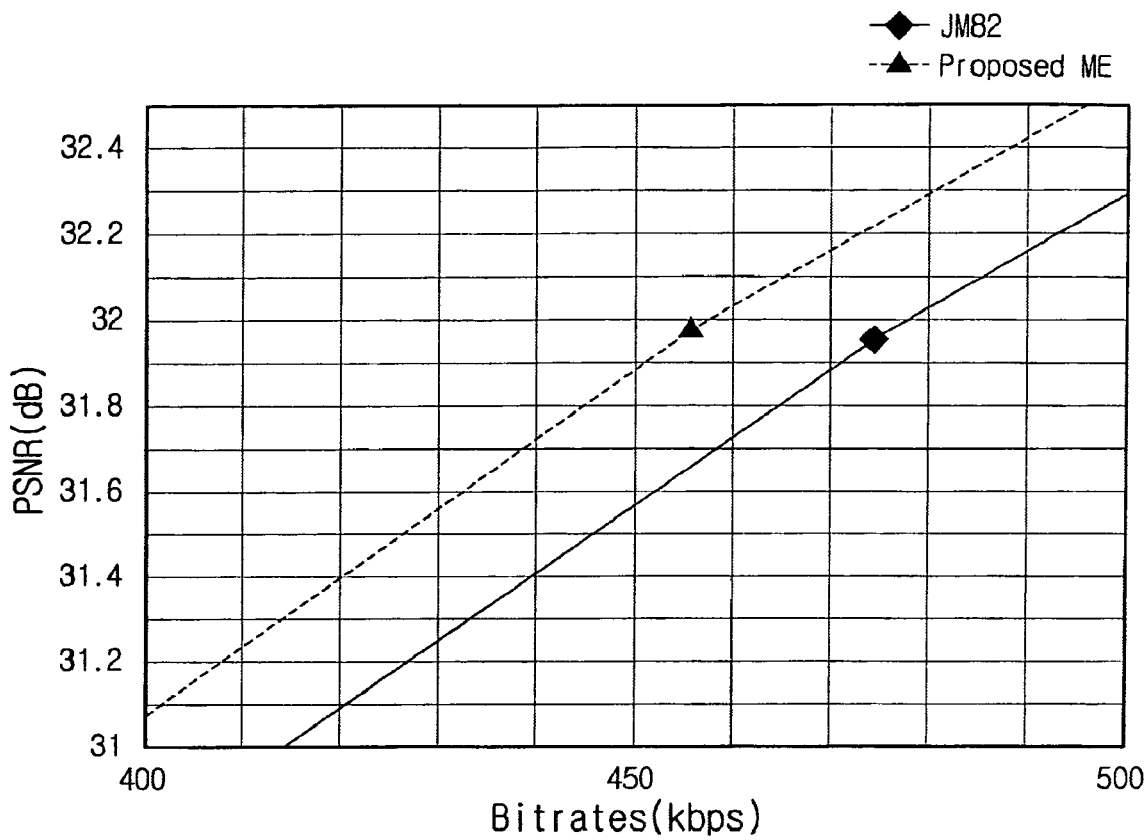
FIGS. 3A to 5B are graphs illustrating bit rate-distortion curves corresponding to motion estimation results by use of a motion estimation method according to the invention and a conventional motion estimation method.
Figure 3A:
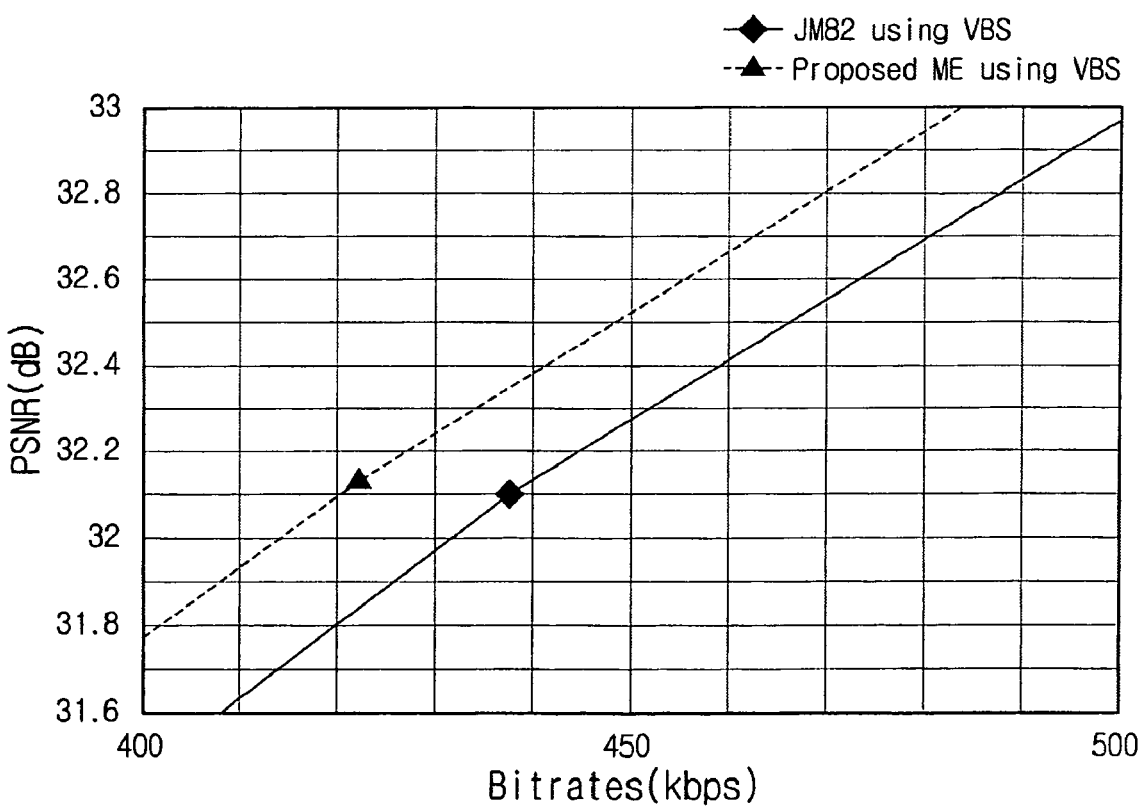
Figure 3B:
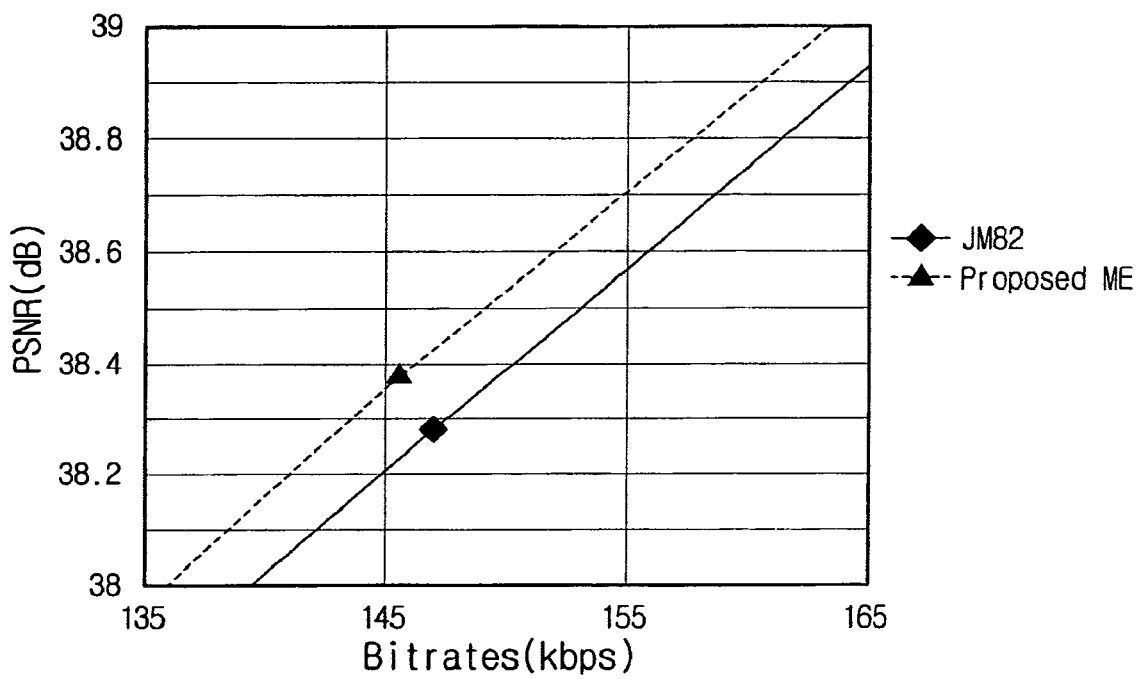
Figure 3B:
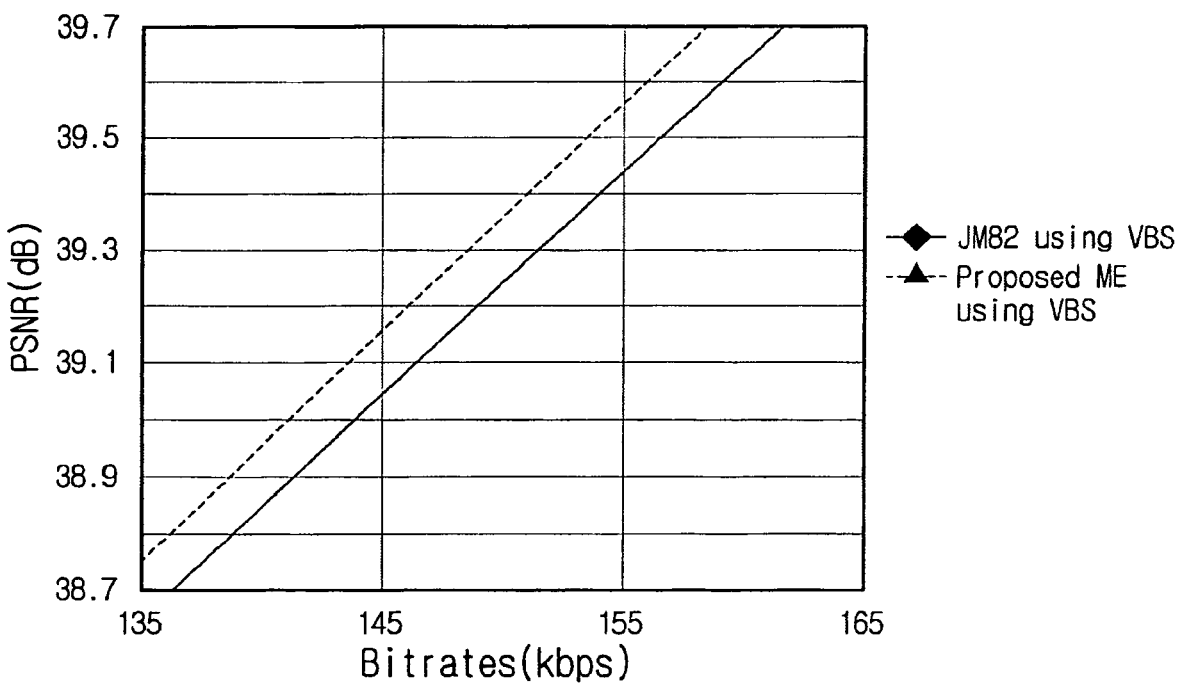
Figure 4A:
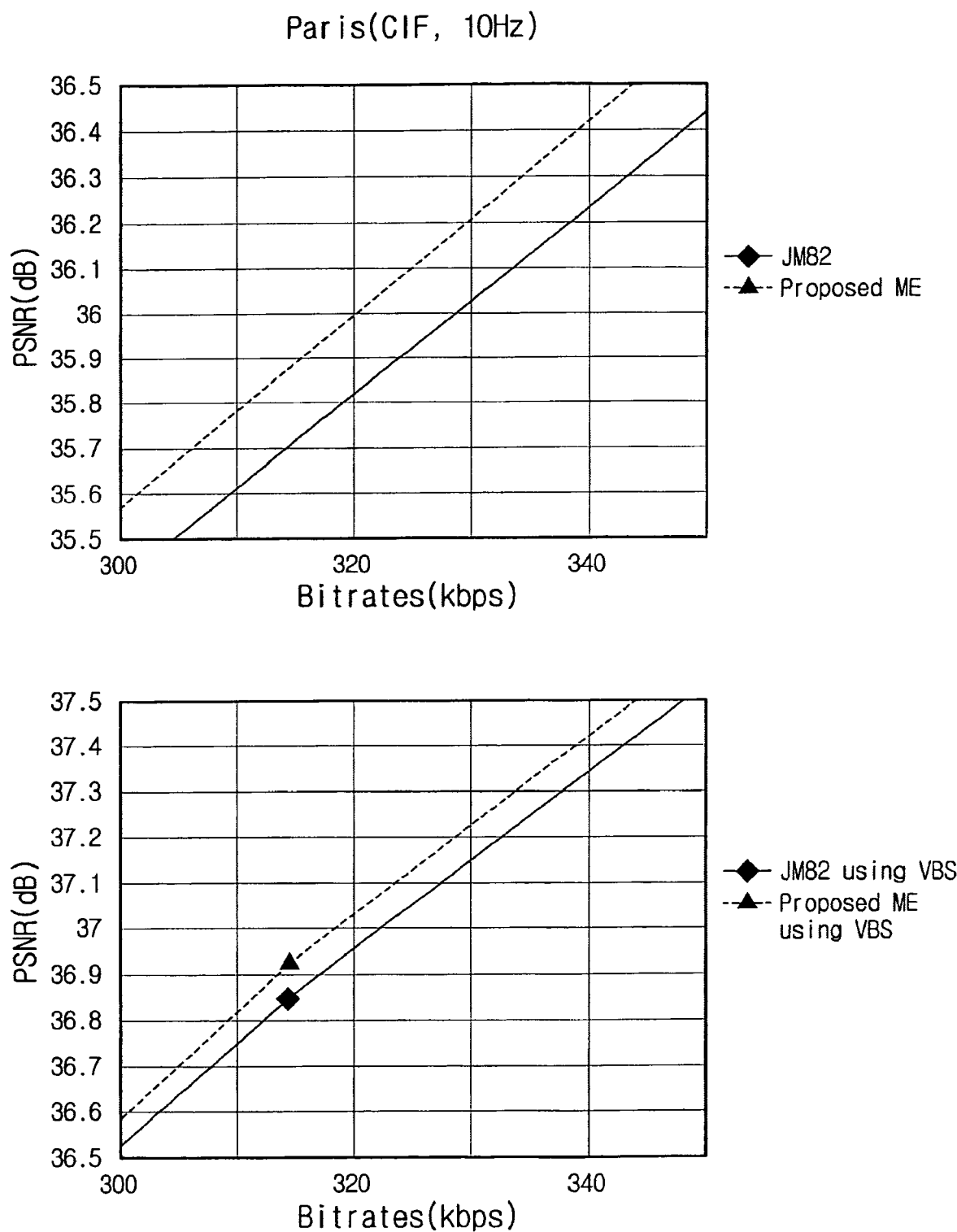
Figure 4B:
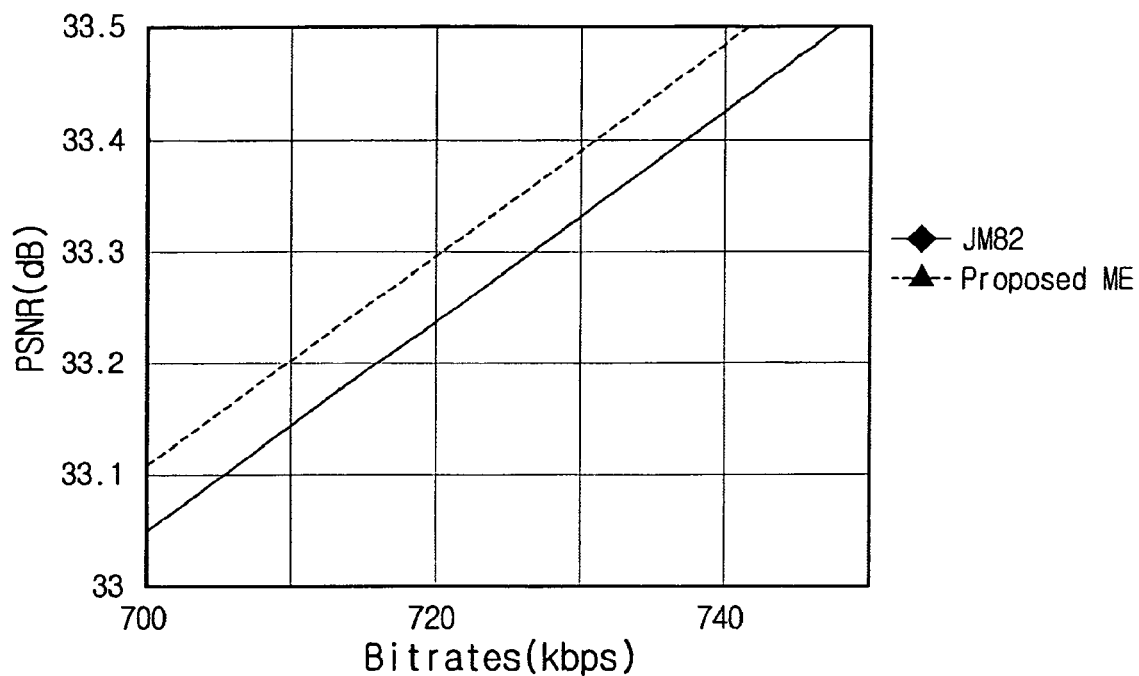
Figure 4B:
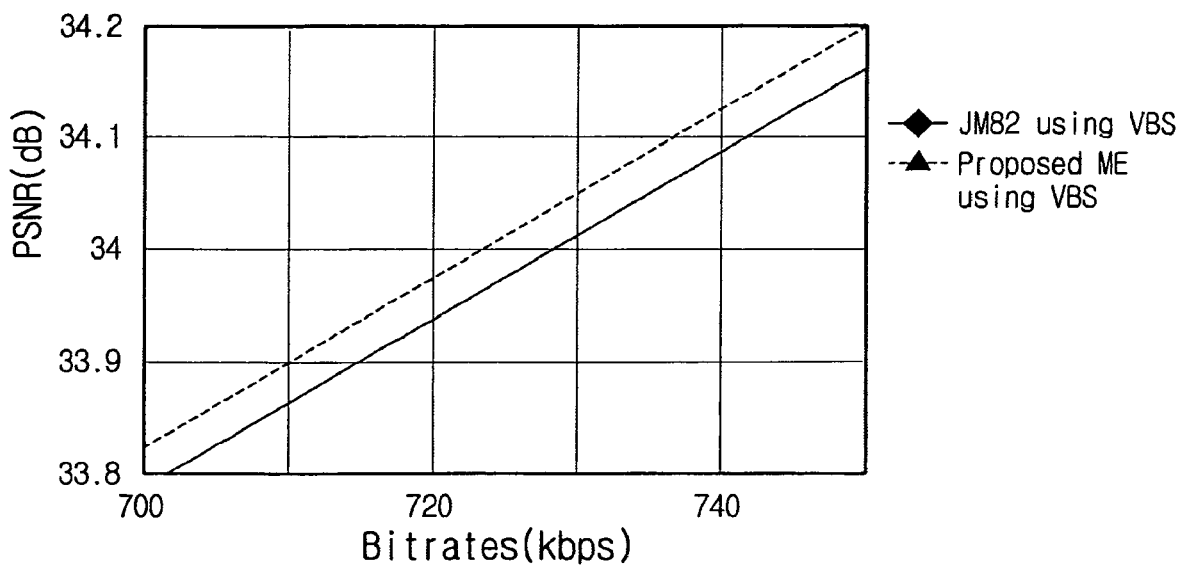
Figure 5A:
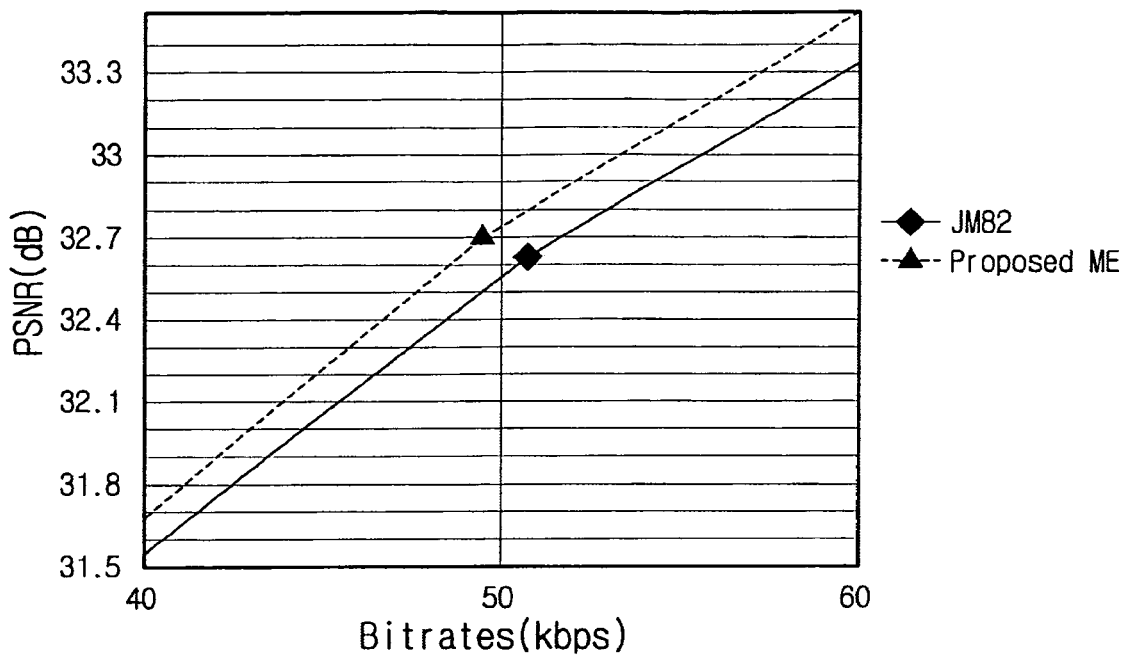
Figure 5A:
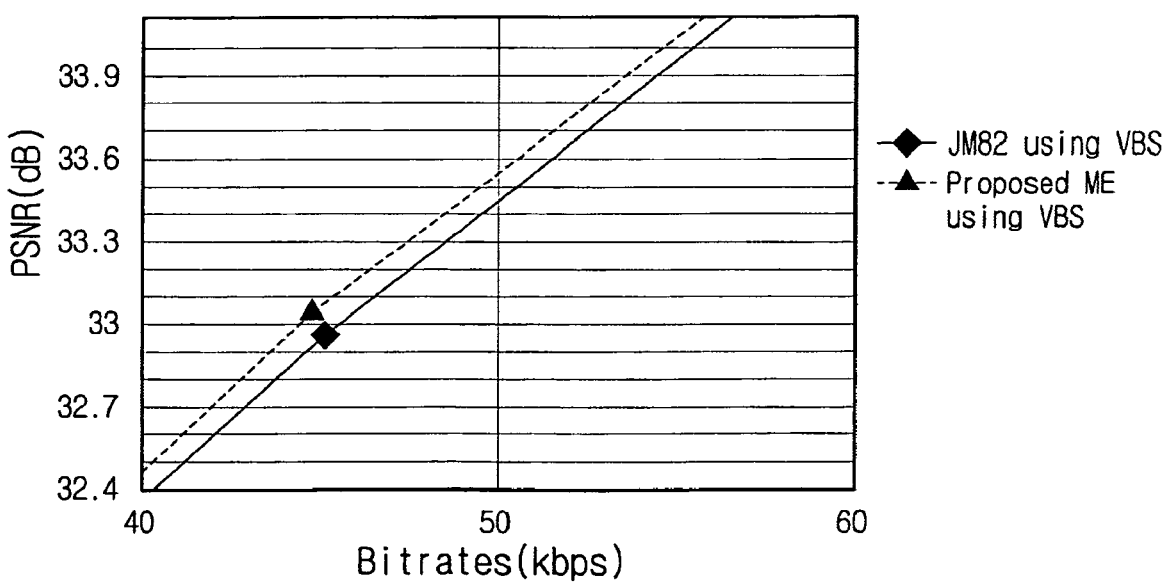
Figure 5B:
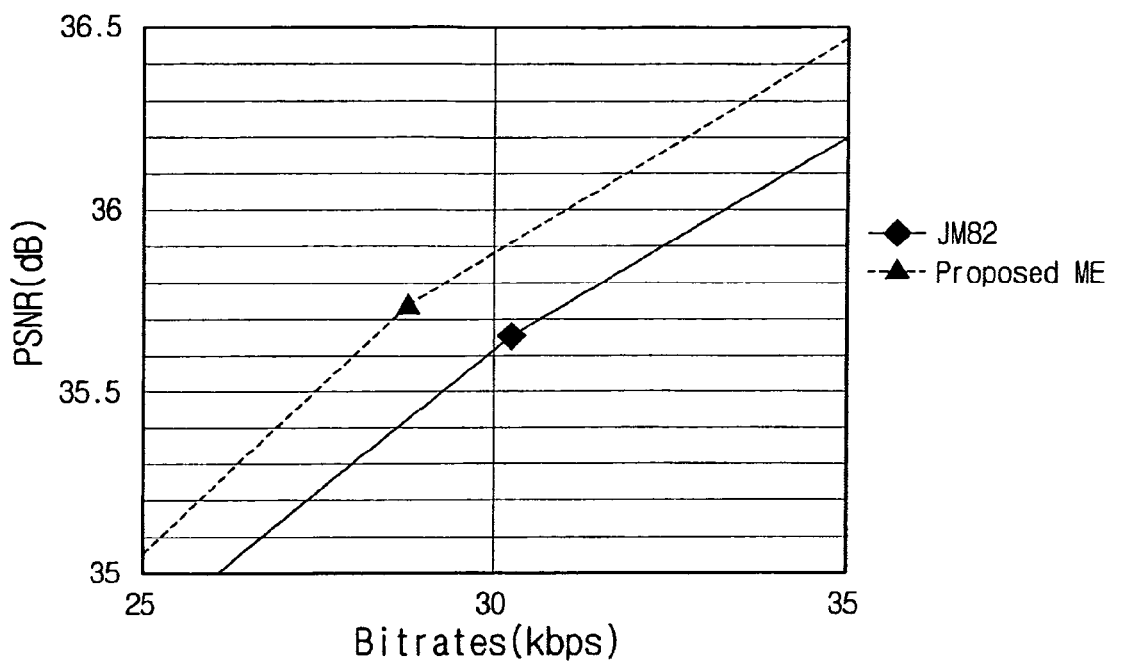
Figure 5B:
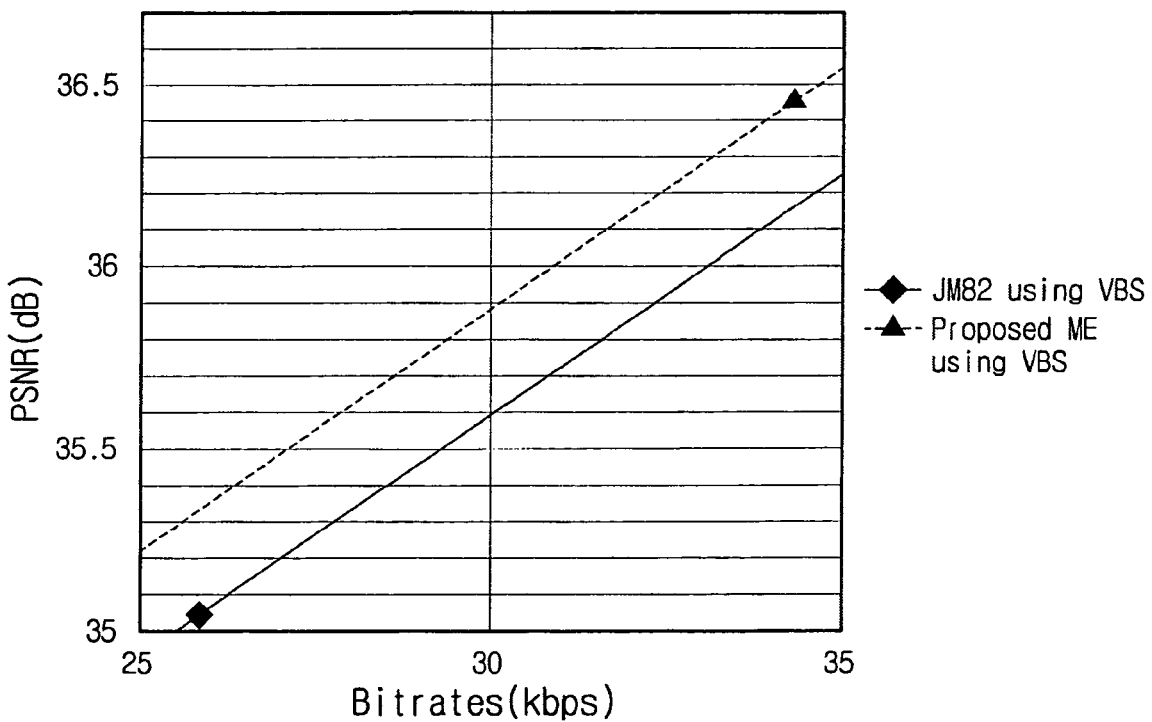

Now, specific encoding and decoding methods according to the invention will be described with reference to FIGS. 2A to 2C. FIG. 2A is a block diagram illustrating a configuration of an encoding device according to a preferred embodiment of the invention, FIG. 2B is a diagram illustrating a method of omitting insertion of a mean pixel value for a block according to a preferred embodiment of the invention, and FIG. 2C is a block diagram illustrating a configuration of a decoding device according to a preferred embodiment of the invention.

The encoding device according to the invention includes a mean brightness value calculating unit for a current frame 210, a mean brightness value calculating unit for a reference frame 220, a motion estimation unit 230, and a motion compensation unit 240.

The motion estimation unit 230 comprises a pattern block generating section 231 for a current frame and a pattern block generating section 233 for a reference frame so as to search the reference frame blocks for a candidate block having a pattern most similar to the pattern of the current frame block. The pattern block generating section 231 for a current frame subtracts the mean brightness value of the current frame calculated by the mean brightness value calculating unit from respective brightness values of the current frame and thus generates a pattern block of the current frame block. The pattern block generating section 233 for a reference frame generates pattern blocks of the reference frame blocks through the use of the same process.

At this time, the mean brightness value calculating unit 210 for a current frame can insert Mcurr denoting the mean pixel value of the current block into a header of a bit stream for transmission to a decoder. This is because the decoder may require the mean pixel value of the current block for reconstructing the current block. For example, Mcurr, which is 8-bit information inserted into the header of a bit stream, can be added to the rear end of a macro block type field.

As described below, by omitting the insertion of Mcurr for some blocks, the amount of bit stream to be transmitted may be minimized. In this case, 1-bit flag information allowing the decoder to recognize Mcurr of the corresponding block may be added thereto. For example, the flag information may be added at the rear end of a macro block type field. Several methods are exemplified as follows, among a variety of methods of recognizing and using Mcurr of the current block by use of Mcurr corresponding to other blocks indicated by the flag information when the addition of Mcurr is omitted.

First, when a bit stream is transmitted to a decoder with omitting the addition of Mcurr for the block, in which the flag information is set to, for example, 1, the decoder can decode the corresponding block by using a mean pixel value of peripheral blocks decoded previously for the block 240, in which the flag information is set to 1. In FIG. 2B, a mean value of Mcurr values such as $M_{curr-1}$, $M_{curr-2}$, and $M_{curr-1}$ of the peripheral blocks decoded previously can be used as Mcurr of the block 240 corresponding to Flag 1 for decoding the block 240. The number and position of blocks used for calculating the mean value can be set in various manners.

Next, by omitting the addition of Mcurr for the block 245, in which the flag information is set to 1, and adding a 1-bit instruction value indicating to decode the corresponding block using Mcurr of the peripheral blocks decoded previously, the amount of bit stream to be transmitted can be reduced. That is, in order to decode the block 245 corresponding to Flag 1 in FIG. 2B, differences between Mcurr values of the peripheral blocks decoded previously, for example, $M_{curr-1}$ and $M_{curr-2}$, and the Mcurr value calculated for the corresponding block 245 are calculated, and the Mcurr value of the block exhibiting the smaller difference is used. For example, suppose that the difference between $M_{curr-1}$, and the Mcurr value of the corresponding block is d1 and the difference between $M_{curr-2}$ and the Mcurr value of the corresponding block is d2. When d1 is smaller, additional information indicating that $M_{curr-1}$ is used as the Mcurr of the corresponding block 245 can be added successively to the flag information. Of course, the range of blocks for calculating the difference value can be set variously. The 8-bit Mcurr value of the corresponding block can be added thereto, not the 1-bit additional information.

Now, the case that Mcurr is transmitted to the decoder from the encoder will be mainly described.

When the pattern block of the current frame block and the pattern blocks of the reference frame blocks are all generated, the motion vector determining section 235 calculates the SADs between the pattern blocks and determines the final motion vector by use of a candidate pattern block exhibiting the least SAD.

Here, the motion vector determining section 235 calculates the SADs through the use of new mathematical equations for the purpose of enhancing the efficiency of the block patterning.

First, in the related art, the SADs for determining the final motion vector is calculated by Eq. 1 described below and a candidate block pattern having the least SAD is determined as the final motion vector.

$$SAD(x, y) = \sum_{i=0}^{S-1} \sum_{j=0}^{T-1} |[f(i, j) - r(i + x, j + y)]| \quad \text{Eq. 1}$$

where f(i,j) denotes a pixel value at a coordinate (i,j) of the current frame, r(i,j) denotes a pixel value of a coordinate (i,j) of the reference frame, and S and T denote the sizes of blocks used for matching the blocks. Here, (x,y) denotes the motion vector.

On the contrary, in the invention, a type of an object not affected by the change in illumination, that is, a pattern, should be extracted so as to minimize an error between the current frame block and the candidate block due to the change in illumination. Therefore, by using a method different from the method utilizing Eq. 1, that is, by using Eq. 2, the pattern blocks can be generated by subtracting the mean pixel value of the respective blocks from the pixel values of the respective blocks.

$$NewSAD(x, y) = \sum_{i=0}^{U-1} \sum_{j=0}^{V-1} |[f(i, j) - M_{curr}] - [r(i+x, j+y) - M_{ref}]| \quad \text{Eq. 2}$$

where Mcurr denotes the mean pixel value of the current frame block and Mref denotes the mean pixel value of the candidate pattern blocks. For example, U and V can be set to 16 or 8. Difference signals between U×V blocks can be encoded through the use of 4×4 DCT and quantization as shown in H.264 Standard.

The motion compensation unit 240 can perform the motion compensation by use of a motion compensation method difference from that of the related art. The motion compensation unit 240 uses, a reference block acquired through the SAD calculating equation of Eq. 2 so as to encode the residual signals. As can be seen from Eq. 3, the motion compensation can be performed by subtracting the mean pixel value from the pixel values of the current block and the reference block.

$$NewR(i, j) = [f(i, j) - M_{curr}] - [r(i + MV_x, j + MV_y) - M_{ref}] \quad \text{Eq. 3}$$
$$= f(i, j) - r(i + MV_x, j + MV_y) - M_{curr} + M_{ref}$$

where NewR denotes the residual signal obtained through subtraction of the mean pixel value. In this way, the mean value of the residual signals can be adjusted close to 0 by subtracting the mean pixel value of the blocks thereby enhancing the compression efficiency reduced due to the change in illumination.

The residual signals NewR are encoded through the use of the DCT and quantization into residual signals NewR' and thus are finally subjected to an entropy coding process. In this way, the encoding process is finished.

FIG. 2C is a block diagram illustrating a configuration of an encoding device according to a preferred embodiment of the invention.

In the course of decoding, the encoded residual signals NewR' are reconstructed through inverse quantization and inverse DCT into residual signals NewR". However, the mean pixel value of the current block is necessarily required for allowing the decoder to perform the reconstruction. Accordingly, additional information on the mean pixel value Mcurr of the current block should be added to the syntax and can be expressed in an 8-bit fixed length code in a preferred embodiment.

The motion compensation unit 250 of the decoding device can decode the reconstructed residual signals NewR" by use of the mean brightness value calculated by the mean brightness value calculating unit 260 for a reference frame, the motion vector received from the encoding device, and the mean brightness value Mcurr of the current block. As described above, when the mean brightness value of the corresponding block is not included and the flag information or the addition information indicating that a mean value of the peripheral blocks or a value of a predetermined peripheral block should be used is added to the header, the decoding can be performed using the corresponding value.

Consequently, the reconstruction process after the inverse quantization and the inverse DCT can be expressed as Eq. 4 described below.

$$f'(i,j)=[r(i+MV_x,j+MV_y)+NewR''(i+j)+M_{curr}-M_{ref}] \quad \text{Eq.4}$$

where f'(i,j) denotes a pixel value at a coordinate (i,j) of the decoded current frame, r(i,j) denotes a pixel value of a coordinate (i,j) of the reference frame, and (x,y) denotes the motion vector. That is, by adding the pixel values of the reference frame in consideration of the motion vector to the reconstructed residual signal NewR", adding the mean pixel value of the current block thereto, and then subtracting the mean pixel value of the candidate block of the reference frame, the pixel value at the coordinate (i,j) of the current frame can be calculated and decoded.

Here, the motion estimation method adaptive to the change in illumination according to the invention can apply to all encoding and decoding methods to be developed in the future, as well as all the existing encoding and decoding methods, including the H.264 standard. When the invention applies to an encoding method, the number of encoding modes is increased to double. This is because an encoding mode employing the mean pixel value is generated for each existing encoding mode. Therefore, a process step of adding an identifier for identifying the encoding mode to a flag field or the like may be additionally provided.

Test results for the encoding method employing the motion estimation according to the invention will be described with the graphs shown in the figures.

The test was executed by use of JM (Joint Model) 8.2, which is a reference encoder of H.264 Standard. The motion estimation and compensation were performed to the case that only a 16×16 block mode is used and the case that all the block modes (16×16, 16×8, 8×16, 8×8, 8×4, 4×8, and 4×4) of a variable block size are used. Images used in the test are a QVGA (Object 1, Flamenco 1) image, a CIF (Paris, Mobile and Calendar) image, and a QCIF (Foreman, Container) image. Here, the CIF and QCIF images are the recommended images for test in H.264, and the QVGA image is a test image made by KDDI Corp., which studies 3DAV (3 Dimensions Audio Video) which is laid in the step of EE (Exploration Experiment) in ISO/IEC MPEG. The Object 1 image is an image repeating the flickering of illumination and the Flamenco 1 image is an image repeating the increase and decrease in illumination. All the test images have 300 frames. Only the first frame was subjected to the intra coding and the other frames were subjected to the estimation encoding (IP-PPP ...). A predetermined bit rate-distortion optimization technique was used for all the experiments. By using an entire area search technique embodied in IM8.2, PSNRs (Peak Signal to Noise Ratio) were compared with those of the motion estimation result.

Referring to FIGS. 3A to 5B, bit rate-distortion curves as results of performing the motion estimation by use of the motion estimation method according to the invention and the conventional method are shown. Here, the axis of abscissa denotes a bit rate and the axis of ordinate denotes PSNR. Referring to FIG. 3B, when only the 16×16 block mode is used and the bit rate 450 kbps, the motion estimation according to the invention, enhances by 0.3 dB or more PSNR in comparison with the motion estimation according to the conventional method. Similarly, FIGS. 3B to 5B show similar tendencies.

Here, when the variable size block mode is used, the enhancement in performance is smaller than that when only the 16×16 block mode is used. It is considered that this is because the residual signals are previously reduced due to the use of the variable size blocks.

In the motion estimation method adaptive to the change in illumination according to the invention described above, the pattern blocks is generated using the mean values of the blocks, the motions estimation is performed using the pattern blocks, and the difference signals between the pattern blocks are encoded. The method causes improvement in encoding efficiency. The efficient reduction of bits is caused in such an image having the change in illumination such as Object 1 or Flamenco 1, and the reduction of bit is obtained in other images.

According to the invention described above, an image can be efficiently encoded and decoded by use of the motion estimation and motion compensation adaptive to the change in illumination.

Further, it is possible to minimize the amount of bit streams to be transmitted to a decoder by omitting insertion of a mean pixel value for some fields.

Furthermore, it is possible to efficiently compress an image without performing the intra coding for the change in illumination.

In addition, it is possible to provide a codec that is strong against the change in illumination in actual surroundings.

Although a preferred embodiment and the modified examples of the present invention have been described, the present invention is not limited to the embodiment and examples, but may be modified in various forms without departing from the scope of the appended claims, the detailed description, and the accompanying drawings of the present invention. Therefore, it is natural that such modifications belong to the scope of the present invention.

What is claimed is:

1. A motion estimation method adaptive to change in illumination, comprising the steps of:
   (a) generating a current frame pattern block for a current frame block and a reference frame pattern block for a reference frame block;
   (b) calculating the sum of absolute differences (SAD) for candidate pattern blocks corresponding to the current frame pattern block among reference frame pattern blocks and determining each candidate pattern block corresponding to the SAD satisfying a predetermined condition among the calculated SAD as a motion vector;
   (c) encoding the current frame block, by generating a residual signal using a difference signal between the candidate pattern block corresponding to the motion vector and the current frame pattern block then performing discrete cosine transform and quantization to the residual signal with a predetermined encoding mode; and
   (d) adding flag information indicating the addition of a mean pixel value applied to the encoded current frame block and identification information on the encoding mode as header information corresponding to the encoded current frame block;
   wherein the addition of a mean pixel value to be applied to the current frame block is identified by the flag information,
   wherein step (a) includes the steps of:
   calculating a mean brightness value of the current frame block and a mean brightness value of the reference frame block; and
   generating the current frame pattern block by subtracting the mean brightness value of the current frame block from brightness values of the current frame block and generating the reference frame pattern blocks by subtracting the mean brightness value of the reference frame block from brightness values of the reference frame block.

2. The motion estimation method according to claim 1, further comprising encoding the mean pixel value of the current frame block.

3. The motion estimation method according to claim 1, wherein the SAD satisfying the predetermined condition indicates a least SAD and the SAD is calculated by the following equation:

$$NewSAD(x, y) = \sum_{i=0}^{U-1}\sum_{j=0}^{V-1} |[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

4. The motion estimation method according to claim 1, wherein the residual signal is calculated by the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

5. A motion estimation device comprising:
a pattern block generating unit generating a current frame pattern block of a current frame block and reference frame pattern blocks of a reference frame block;
a motion vector determining unit calculating the sum of absolute differences (SAD) of candidate pattern blocks corresponding to the current frame pattern block among the reference frame pattern blocks and determining each candidate pattern block corresponding to the SAD satisfying a predetermined condition among the calculated SAD as a motion vector;
a motion compensation unit generating a residual signal using a difference signal between the candidate pattern block corresponding to the motion vector and the current frame pattern block; and
an adding unit adding flag information indicating the addition of a mean pixel value applied to an encoded current frame block and identification information on an encoding mode as header information corresponding to the encoded current frame block;
wherein the addition of a mean pixel value to be applied to the current frame block is identified by the flag information,
wherein the pattern block generating unit:
calculates a mean brightness value of the current frame block and a mean brightness value of the reference frame block;
generates the current frame pattern block by subtracting the mean brightness value of the current frame block from brightness values of the current frame block; and
generates the reference frame pattern blocks by subtracting the mean brightness value of the reference frame block from brightness values of the reference frame block.

6. The motion estimation device according to claim 5, further comprising a unit carrying out discrete cosine transform and quantization to the residual signal.

7. The motion estimation device according to claim 5, wherein the SAD satisfying the predetermined condition indicates a least SAD and the motion vector determining unit calculates the SAD with the following equation:

$$NewSAD(x, y) = \sum_{i=0}^{U-1}\sum_{j=0}^{V-1} |[f(i, j) - M_{curr}] - [r(i + x, j + y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

8. The motion estimation device according to claim 5, wherein the motion compensation unit calculates the residual signal with the following equation:

$$NewR(i, j) = [f(i, j) - M_{curr}] - [r(i + MV_x, j + MV_y) - M_{ref}]$$
$$= f(i, j) - r(i + MV_x, j + MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

9. A motion estimation method comprising the steps of:
(a) generating a current frame pattern block for a current frame block and a reference frame pattern block for a reference frame block;
(b) calculating the sum of absolute differences (SAD) for candidate pattern blocks corresponding to the current frame pattern block among reference frame pattern blocks and determining each candidate pattern block corresponding to the SAD satisfying a predetermined condition among the calculated SAD as a motion vector;
(c) encoding the current frame block, by generating a residual signal using a difference signal between the candidate pattern block corresponding to the motion vector and the current frame pattern block then performing discrete cosine transform and quantization to the residual signal with a predetermined encoding mode; and
(d) adding flag information indicating whether a mean pixel value of the encoded current frame block is included and identification information on the encoding mode to the encoded current frame block as header information,
wherein whether the mean pixel value of the current frame block is included is identified by the flag information,
wherein step (a) includes the steps of:
calculating a mean brightness value of the current frame block and a mean brightness value of the reference frame block; and
generating the current frame pattern block by subtracting the mean brightness value of the current frame block from brightness values of the current frame block and generating the reference frame pattern blocks by subtracting the mean brightness value of the reference frame block from brightness values of the reference frame block.

10. The motion estimation method according to claim 9, wherein the current frame block is set to at least one type of 16×16, 16×8, 8×16, 8×8, 8×4, 4×8, and 4×4.

11. The motion estimation method according to claim 9, wherein when the flag information indicates that the mean pixel value is not included, a mean value of mean pixel values corresponding to n blocks surrounding the current frame block is used as the mean pixel value of the current frame block.

12. The motion estimation method according to claim 9, wherein when the flag information does not contain the mean pixel value and the header information further contains additional information indicating that the mean pixel value corresponding to any block among the blocks surrounding the current frame block should be used, a mean pixel value of the block corresponding to the additional information is used as the mean pixel value of the current frame block.

13. The motion estimation method according to claim 9, further comprising the step of encoding the mean pixel value of the current frame block.

14. The motion estimation method according to claim 9, wherein the SAD satisfying the predetermined condition indicates a least SAD and the SAD is calculated by the following equation:

$$NewSAD(x, y) = \sum_{i=0}^{U-1}\sum_{j=0}^{V-1}|[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i+x,j+y) denotes a pixel value of a coordinate (i+x,j+y) of the reference frame, U and V denote the sizes of blocks used for matching the blocks, and (x,y) denotes the motion vector.

15. The motion estimation method according to claim 9, wherein the residual signal is calculated by the following equation:

$$NewR(i, j) = [f(i, j) - M_{curr}] - [r(i+MV_x, j+MV_y) - M_{ref}]$$
$$= f(i, j) - r(i+MV_x, j+MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

16. A motion estimation device comprising:
a pattern block generating unit generating a current frame pattern block for a current frame block and reference frame pattern blocks for a reference frame block;
a motion vector determining unit calculating the sum of absolute differences (SAD) for candidate pattern blocks corresponding to the current frame pattern block among the reference frame pattern blocks and determining each candidate pattern block corresponding to the SAD satisfying a predetermined condition among the calculated SAD as a motion vector;
a motion compensation unit generating a residual signal using a difference signal between the candidate pattern block corresponding to the motion vector and the current frame pattern block; and
an adding unit adding flag information indicating whether a mean pixel value of an encoded current frame block is included and identification information on an encoding mode to the encoded current frame block as header information,
wherein whether the mean pixel value of the current frame block is included is identified by the flag information,
wherein the pattern block generating unit:
calculates a mean brightness value of the current frame block and a mean brightness value of the reference frame block;
generates the current frame pattern block by subtracting the mean brightness value of the current frame block from brightness values of the current frame block; and
generates the reference frame pattern blocks by subtracting the mean brightness value of the reference frame block from brightness values of the reference frame block.

17. The motion estimation device according to claim 16, wherein when the flag information indicates that the mean pixel value is not included, a mean value of mean pixel values corresponding to n blocks surrounding the current frame block is used as the mean pixel value of the current frame block.

18. The motion estimation device according to claim 16, wherein when the flag information does not contain the mean pixel value and the header information further contains additional information indicating that the mean pixel value corresponding to any block among the blocks surrounding the current frame block should be used, a mean pixel value of the block corresponding to the additional information is used as the mean pixel value of the current frame block.

19. The motion estimation device according to claim 16, further comprising a unit carrying out discrete cosine transform and quantization to the residual signal.

20. The motion estimation device according to claim 16, wherein the SAD satisfying the predetermined condition indicates a least SAD and the motion vector determining unit calculates the SAD with the following equation:

$$NewSAD(x, y) = \sum_{i=0}^{U-1}\sum_{j=0}^{V-1}|[f(i, j) - M_{curr}] - [r(i+x, j+y) - M_{ref}]|$$

where Mcurr denotes the mean pixel value of the current frame block, Mref denotes the mean pixel value of the candidate pattern blocks, f(i,j) denotes a pixel value at a coordinate (i,j) of the current frame, r(i+x,j+y) denotes a pixel value of a coordinate (i+x,j+y) of the reference frame, U and V denote the sizes of blocks used for matching the blocks, and (x,y) denotes the motion vector.

21. The motion estimation device according to claim 16, wherein the motion compensation unit calculates the residual signal with the following equation:

$$NewR(i, j) = [f(i, j) - M_{curr}] - [r(i+MV_x, j+MV_y) - M_{ref}]$$
$$= f(i, j) - r(i+MV_x, j+MV_y) - M_{curr} + M_{ref}$$

where NewR denotes the residual signal, Mcurr denotes the mean pixel value of the current frame block, Mref denotes the mean pixel value of the candidate pattern blocks, f(i,j) denotes a pixel value at a coordinate (i,j) of the current frame, r(i,j) denotes a pixel value of a coordinate (i,j) of the reference frame, U and V denote the sizes of blocks used for matching the blocks, and (x,y) denotes the motion vector.

* * * * *